(12) United States Patent
Kiser et al.

(10) Patent No.: US 7,393,449 B1
(45) Date of Patent: Jul. 1, 2008

(54) PETROLEUM HYDROCARBON BINDER WITH REDUCED POLYCYCLIC AROMATIC HYDROCARBON CONTENT

(75) Inventors: Melvin D. Kiser, Huntington, WV (US); David C. Boyer, Huntington, WV (US)

(73) Assignee: Marathon Ashland Petroleum LLC, Findlay, OH (US)

( * ) Notice: Subject to any disclaimer, the term of this patent is extended or adjusted under 35 U.S.C. 154(b) by 209 days.

(21) Appl. No.: 11/444,849

(22) Filed: May 31, 2006

Related U.S. Application Data

(62) Division of application No. 10/294,467, filed on Nov. 14, 2002, now Pat. No. 7,067,050.

(51) Int. Cl.
*C01G 69/02* (2006.01)
*C01G 3/00* (2006.01)
*C01C 3/00* (2006.01)
*C01C 1/00* (2006.01)
*C01C 1/04* (2006.01)
*C01C 1/20* (2006.01)
*C01C 1/18* (2006.01)
*C08L 97/00* (2006.01)

(52) U.S. Cl. .................... 208/60; 208/4; 208/6; 208/22; 208/23; 208/39; 208/40; 208/41; 208/44; 208/45; 106/273.1

(58) Field of Classification Search ............ 208/4, 208/6, 22, 23, 39, 40, 41, 44, 45, 60; 106/273.1, 106/277
See application file for complete search history.

(56) References Cited

U.S. PATENT DOCUMENTS

| | | | |
|---|---|---|---|
| 2,211,244 A | 8/1940 | Routledge | |
| 2,768,119 A | 10/1956 | Nash | |
| 2,831,778 A | 4/1958 | Allison et al. | |
| 4,139,397 A * | 2/1979 | Yan | 106/278 |
| 4,211,576 A * | 7/1980 | Yan | 106/278 |
| 4,271,118 A | 6/1981 | Schreiner-Hansen | |
| 4,382,054 A | 5/1983 | Hukkanen | |
| RE32,792 E * | 11/1988 | Izumi et al. | 208/44 |
| 4,921,417 A | 5/1990 | Sato | |
| 5,174,581 A | 12/1992 | Goodson | |
| 5,182,010 A * | 1/1993 | Mochida et al. | 208/44 |
| 5,389,142 A | 2/1995 | Moore | |
| 5,397,132 A | 3/1995 | Maryska | |
| 5,467,998 A | 11/1995 | Hellings | |
| 5,494,567 A * | 2/1996 | Tamaki | 208/44 |
| 5,547,654 A * | 8/1996 | Machida et al. | 423/445 R |
| 5,644,018 A * | 7/1997 | Kojima et al. | 528/247 |
| 5,649,707 A | 7/1997 | Brander et al. | |
| 5,651,550 A | 7/1997 | LaVorgna et al. | |
| 5,676,377 A | 10/1997 | Lynn, Jr. et al. | |
| 5,746,906 A | 5/1998 | McHenry et al. | |
| 5,779,880 A * | 7/1998 | Maruyama et al. | 208/44 |
| 5,788,243 A | 8/1998 | Harshaw et al. | |
| 5,915,695 A | 6/1999 | Wisocki et al. | |
| 5,947,475 A | 9/1999 | Skeuse et al. | |
| 6,257,582 B1 | 7/2001 | Gaese et al. | |
| 6,361,591 B1 * | 3/2002 | Boyer et al. | 106/277 |
| 7,033,485 B2 * | 4/2006 | Saver et al. | 208/41 |
| 2002/0185411 A1 * | 12/2002 | Saver et al. | 208/39 |

* cited by examiner

*Primary Examiner*—Walter D. Griffin
*Assistant Examiner*—Huy-Tram Nguyen
(74) *Attorney, Agent, or Firm*—Emch, Schaffer, Schaub & Porcello Co., L.P.A.

(57) ABSTRACT

A binder pitch material includes a petroleum pitch and asphalt fraction obtained from petroleum crude oil and has a significantly lower polycyclic aromatic hydrocarbon composition than a coal tar pitch having a like softening point. The pitch material is useful as a binder material for various applications such as clay pigeons.

11 Claims, No Drawings

PETROLEUM HYDROCARBON BINDER WITH REDUCED POLYCYCLIC AROMATIC HYDROCARBON CONTENT

CROSS REFERENCE TO RELATED APPLICATION

This application is a divisional of and claims the benefit of U.S. patent application Ser. No. 10/294,467 filed Nov. 14, 2002 now U.S. Pat. No. 7,067,050.

FIELD OF THE INVENTION

The invention relates to pitch products useful as petroleum based hydrocarbon binders, specifically binders for clay pigeons. The binders are useful to produce a rapidly-solidifying frangible pitch, containing low concentrations of polycyclic aromatic hydrocarbons and to produce products made therewith, specifically clay pigeons.

BACKGROUND OF THE INVENTION

Pitch and pitch products have been around since biblical times. Noah made wood tar pitch which is a thermal polymerization product of tree sap, heated for a long time to induce the polymerization.

Coal tar pitch is one of the end products of destructive distillation of coal. Subjecting coal to high temperatures causes vaporous products to separate out of the coal sample. These vaporous products, when fractionated to remove light ends, produce coal tar pitch, which is a glassy solid at room temperature.

Another pitch product is produced from petroleum (crude oil). The most common processes used to generate petroleum pitches are, singularly or a combination of, (a) solvent deasphalting, (b) oxidation, (c) catalytic, and (d) thermal processes. Feedstocks to produce petroleum pitch can be comprise of compositions that range from predominantly aliphatic to predominantly aromatic type chemical structures, as disclosed in Developing Coal Tar/Petroleum Pitches, R. H. Wombles, M. D. Kiser, "Developing Coal Tar/Petroleum Pitches", *Light Metals,* 2000, The Minerals, Metals, and Materials Society, Warrendale, Pa. 2000.

Each of these types of "pitch" generally have specific and unique characteristics that make each type of pitch useful for producing different types of intermediate and/or end products. For example, coal tar pitch is suitable for many uses, including but not limited to roofing material, a binder for anodes, a binder for clay pigeons, and myriad other uses. The primary disadvantage or concern with coal tar pitch is the high level of polycyclic aromatic hydrocarbons, some of which are regulated by governmental agencies (OSHA regulations (1910.1200)) present in the processing of the coal tar pitch and in the resulting end products.

The McHenry U.S. Pat. No. 5,746,906 described reducing the level of irritating and/or regulated polycyclic aromatic hydrocarbons in a pitch product by blending a high softening point coal tar pitch with a lower softening point petroleum pitch product. The combined pitch product had a much lower polycyclic aromatic hydrocarbon content, some of which are regulated by governmental agencies (OSHA regulations (1910.1200)) by replacing some of the coal tar derived compounds with those of petroleum origin.

The Nash U.S. Pat. No. 2,768,119 describes pitches made from petroleum which have properties similar to coal tar pitches.

There have been other attempts at reducing the amount of coal tar pitch used in products in some low softening point applications. A series of driveway sealer patents have recently issued relating to blends of coal tar pitch and petroleum pitch, and blends of petroleum pitch with conventional asphalts produced in a refinery, including U.S. Pat. No. 6,267,809, Boyer et al. These materials have satisfactory performance as a sealer base and as coatings.

The pitch products discussed above can be generally classified as high tech, high softening point pitch (for binder pitch application) or as low-tech, low softening point pitch (for driveway sealers and coatings). In the high tech, high softening point applications, the pitch is subjected to many stringent processing requirements and there are strict limits on the amounts sulfur and other impurities that can be present. In the low softening point, lower tech, applications, the product specifications generally permit much higher levels of sulfur and other impurities.

A typical example of one pitch application is as a binder for clay pigeons or other porous materials. Most clay pigeons are currently made from a mixture of pulverized limestone and a commercially available coal tar pitch. In this application the glassy nature, or crystalline behavior, of the coal tar pitch is a highly desirably property. The crystalline behavior causes the clay pigeon, when struck by a shot, to disintegrate. However, the clay pigeon must also possess significant strength so that the clay pigeon can be launched by hand or mechanical launcher without disintegrating during launch. Another example is a related, and somewhat heavier, clay pigeon designed to roll along the ground and simulate a rabbit or other small forest creature. Other types of targets with varying dominions are also produced to provide different challenges to shooting sports. Examples of these target types include the "Midi", "Mini", "Battue" and "Flash". Black's 1998 Wing & Clay, L. Re editor, JFB, Inc., Red Bank, N.J., pg. 222.

The Hukkanen U.S. Pat. No. 4,382,054 describes a pitch made of gypsum containing crystal water and other ingredients such as high water binding substitutes such as calk (CaO).

The Brander et al. U.S. Pat. No. 5,649,707 describes a calcium based clay pigeon with calcium and limestone or mortar having a coal tar pitch petroleum resin as a binder.

While clay pigeons manufactured with pitch as a binder have been sold and used for over a century, one drawback to this well proven commercial product is that there is growing concern about the toxicity of the clay pigeon residue. OSHA regulations (1910.1200) require reporting on the Material Safety Data Sheet (MSDS) of certairi compounds If the concentration is equal to or greater than 0.1 wt %. Further details may be found at their Web site, http://www.osha-slc.gov/OshStd data/1910.1200.html United States Department of Labor, Occupational Health & Safety Administration, Mar. 7, 2002.

While the amounts of compounds such as those described above are elatively small, there are still some concerns about spreading an arguably toxic or hazardous substance on the land. Therefore, there is a growing demand for a clay pigeon which performs satisfactorily, but which has less environmental impact.

In particular, a significant concern exists over specific polycyclic aromatic hydrocarbons being carried into the water table by the United States Environmental Protection Agency. Details of these concerns may be found in the USEPA Web site, http://epa.gov/ttn/atw/hlthef/polycv-cl.html, United States Environmental Protection Agency, Mar. 7, 2002.

In recent years, there have been many attempts to produce a pitch-free clay pigeon product, and even produce one that was edible, but so far only one, using sulfur as a binder, has received any significant acceptance in the market place. These products typically require elaborate processing steps, so that while a biodegradable, even edible, target can be made, it is expensive and the resulting target has not met with wide spread acceptance.

The Allison et al. U.S. Pat. No. 2,831,778 describes a target made of 60-66% limestone, and 30-35% coal tar pitch, and 1-5% of paraffinic oil such as "residual oil # 6".

The Rutledge U.S. Pat. No. 2,211,244 describes a target containing 65% wt. coal tar pitch and 35% wt. limestone dust.

The Sato U.S. Pat. No. 4,921,417 describes clay pigeons made of soil, ice and asphalt, which is painted before being cooled to prevent an oil element oozing from the inside of asphalt clay pigeon.

The Goodson U.S. Pat. No. 5,174,581 describes a biodegradable and edible clay pigeon composed of sugar, birdseed, and water.

The Moore U.S. Pat. No. 5,389,142 describes a biodegradable clay target of clay, water, and a sodium silicate/sugar binder. The Maryska U.S. Pat. No. 5,397,132 describes a gypsum based clay pigeon having a thin, and relatively brittle, skin over softer particulate gypsum composition on the inner body.

The Hellings U.S. Pat. No. 5,467,998 describes a non-toxic, edible, skeet made of flour, water, and ground seeds.

The LaVorna et al. U.S. Pat. No. 5,651,550 describes a biodegradable, edible target of ground forage.

The Lynn Jr., et al. U.S. Pat. No. 5,676,377 describes a biodigestable cold-skeet target comprised of finely ground food grains or seeds in a molasses binder.

The Harshaw et al. U.S. Pat. No. 5,788,243 describes a biodegradable target comprising cellulose wood flour, an organic binder, and a release agent.

The Wisoki et al. U.S. Pat. No. 5,915,695 describes a biodegradable target made from a mixture of clay material and peat material molded into a shape of a target.

The Skeus et al. U.S. Pat. No. 5,947,475 describes an environmentally safe target made from sulfur and fillers such as gypsum, sand, clay, fly ash, glass, metallic sulfate, non-metallic sulfates, rock, mexaloxides and silicates. The patent also describes a prior art as a brand of targets called "White Flyer" (target made of petroleum pitch and limestone). This patent reported that international publication number WO 94/09339 taught use of sulfur and chalk as fillers, and that Canadian Patent 959203 and German Patent 22 54 725 described pitch free targets.

The Gase et al. U.S. Pat. No. 6,257,582 B1 describes a method of making a target by mixing gypsum, grain flour, water and liquid to form a pastry mix and extruding it and drying it to form a target.

The Schreiner-Hansen U.S. Pat. No. 4,271,118 describes a non-toxic clay pigeon of plaster, calcium carbonate, and surfactants.

Neat petroleum pitch, such as Marathon Ashland Petroleum A-240 pitch or Troulmen T-250 pitch, has been used for many years for the production of clay pigeons. Like coal tar pitch, petroleum pitch has been successfully used to product clay pigeon targets. However, similar concerns have arisen as with coal tar pitch since petroleum pitch also contains as polycyclic aromatic hydrocarbons, some of which are regulated by governmental agencies (OSHA regulations (1910.1200)). Concentrations of these compounds are significantly lower in petroleum pitch than In typical coal tar pitches, however some are still above the limits considered to be reportable per OSHA regulations (1910.1200). Other, non-regulated polycyclic aromatic hydrocarbon have also been detected in petroleum pitch.

In addition to the manufacturing costs, there are other concerns with some of the "green" clay pigeons, either with susceptibility to water damage in storage, instability in storage, or deposition of an unpleasant (although environmentally benign) looking residue on the ground.

Therefore, there is a continuing need for an improved pitch product with reduced polycyclic aromatic hydrocarbon content.

There is a further need for a binder useful to produce a rapidly-solidifying frangible pitch.

There is still a further need to produce improved products with such binder, including, for example, clay pigeons.

SUMMARY OF THE INVENTION

In one aspect, the present invention relates to a thermoplastic frangible pitch material which is amorphous solid at room temperature. The concentration of polycyclic aromatic hydrocarbons of the thermoplastic frangible pitch material is below limits considered to be reportable per OSHA regulations (1910.1200). In certain embodiments, the total identified polycyclic aromatic hydrocarbon content is in the range of about 5,000 mg/kg or less.

The frangible pitch material is derived from (i) the distillation, solvent extraction, thermal or catalytic processing of petroleum oils, such as, but not limited to, aromatic and asphaltic fractions having an initial softening point ranging from about 100° C. to about 130° C., and (ii) an asphalt fraction having a high softening point produced by distillation or solvent extraction of asphalt containing petroleum crude oil and up to about 50% of a solvent or cut back oil having specific gravities ranging from about 0.90 to about 1.10. In certain embodiments, the solvent cut back amount can range from about 10 to about 50%. The resultant frangible pitch material has a softening point in the range of about 20° C. to about 160° C.

In certain aspects, the petroleum pitch asphalt fraction comprises about 20% to about 40% petroleum pitch and about 60 to about 80% asphalt.

In other aspects, the petroleum pitch asphalt fraction comprises about 40 to 60% petroleum pitch and about 40 to 60% asphalt.

In still other aspects, a ratio of petroleum constituents (used to produce the final pitch) to asphalt is based on an analysis of polycyclic aromatic hydrocarbons of all components. In certain embodiments the ratio is about 50% petroleum pitch and about 50% other asphalt components.

The frangible pitch material is an amorphous solid exhibiting friability at room temperature. In certain embodiments, the asphalt fraction has a minimum softening point of about 70° C. (160° F.). In other embodiments, the asphalt fraction has a softening point above 100° C. (212° F.) and less than about 160° C.

In another aspect, the present invention also relates to a pitch material used to produce binders containing relatively low concentrations of polycyclic aromatic hydrocarbons for various applications including but not limited to the manufacturer of clay pigeons/specialty targets.

In yet another aspect, the present invention relates to a method of making a thermoplastic frangible pitch material containing a petroleum pitch and an asphalt fraction having a relatively low concentration of polycyclic aromatic hydrocarbons. One particular method includes the steps of isolating by solvent de-asphalting (SDA) a suitable asphalt material having a softening point in the range of about 70° C. to about 160° C., mixing the SDA asphalt with a petroleum pitch material having a softening point in the range of about 100° C. to about 160° C., and optionally, adjusting the softening point by adding up to about 50% of a suitable solvent or cut back oil.

DESCRIPTION OF INVENTION

In one aspect the present invention relates to the incorporation of selected petroleum products, such as compounds produced from distillation, solvent extraction, thermal or catalytic processes, vacuum tower bottoms and/or the residue from solvent deasphalting, into a petroleum binder product. Useful products, such as binder pitch, are produced for use in manufacturing clay pigeons, which do not contain reportable amounts of polycyclic aromatic hydrocarbons, specifically those regulated by governmental agencies such as those noted OSHA regulations (1910.1200).

We also discovered that while many asphalts could be used, including conventional asphalts obtained by distillation, that superior results are obtained using asphalt obtained by solvent deasphalting (SDA) or the closely related residual oil supercritical extraction (ROSE) asphalt or ROSE pitch, as it is sometimes called. Certain preferred SDA asphalts have had a very high softening point. This is especially unexpected since the very high softening point makes such SDA asphalts difficult to use in many conventional applications.

In another aspect of the present invention, other rapidly solidifying or high friability pitch-based products containing low concentrations of polycyclic aromatic hydrocarbons are produced.

Asphalts

Asphalt is an essential component of the present invention. Asphalts are dark brown to black sementitious material, solid or semi-solid in consistency, in which the predominating constituents are bitumens which exist in nature as such or are obtained as residua in petroleum refining.

In some applications, the asphalt material can be produced by distillation, but in general it is preferred to use asphalts which have been obtained by a solvent deasphalting process, such as propane deasphalting.

Many solvent deasphalting processes now operate in the super critical regime to recover solvents in the deasphalting process. One process is the ROSE, residual oil and super critical extraction process. The super critical portion of the process is directed to solvent recovery and does not have a major effect on the properties of the asphalt produced. Accordingly, either asphalt obtained by conventional propane deasphalting, or by ROSE process can be used herein.

One important parameter in the choice of asphalts is the softening point. High softening points are desired for some applications, especially clay pigeons, because they facilitate manufacturing of the material (rapid set up time) and produce a more brittle product which shatters when hit by shot gun pellets.

An additional benefit of the use of the high softening point, solvent deasphalted asphalts is that such use permits relatively high temperatures to be used for the forming of the targets, so that subsequent cooling can be rapid. As applied to clay pigeons, the thinnest portion of the pigeon is the central region, with the edge portions being far denser to withstand the throwing force. Rapid cooling in the center, and much more moderate cooling in the rim regions of the target, maybe a significant contributor to creation of internal stress in at least the central region of the clay pigeon, enhancing fragility.

Useful asphalts have a softening point greater than about 70° C. (160° F.), as measured by ASTM Method D 3104. The preferable asphalts have a softening point greater than about 100° C. (212° F.) and less than about 160° C.

SDA asphalt is produced in more than 50 refineries throughout the United States. SDA asphalt is rarely sold as a separate product because of its poor quality for conventional asphalt uses. A significant amount of SDA asphalt is diluted with kerosene or other liquid hydrocarbon cutter stocks and sold as No. 6 oil or as other low value fuel oil product. Some SDA asphalt is disposed of by charging to a coker.

According to the present invention, SDA asphalt is one of the preferred asphalt components. The asphalt is prepared by separating by solvent extraction from non-asphaltic components. Propane de-asphalting is also useful de-asphalting technology, though recovery of de-asphalting solvent by operating some portions in the process in the super critical regime (ROSE) is often favored for energy efficiency. More details of various solvent de-asphalting processes are disclosed in U.S. Pat. Nos. 3,998,726 and 3,972,807 which are incorporated by reference. The SDA process, and fractionation columns upstream of it, preferably run in a crude process selected to produce an asphalt with the following properties: broadly 180° F. or greater softening point, preferably greater than about 90° F. softening point. The extent of solvent extraction and the resulting softening point of the SDA bottoms impacts the hardness of the product made therefrom.

Asphalt can also be made from distillation which can be any heavy hydrocarbon having certain minimum specifications. Preferred asphalt fractions from asphaltic crudes produced by vacuum distillation. These materials may be "air blown" oxidating thermal processing to increase viscosity or viscosity penetration index or some other property using conventional technology as disclosed in U.S. Pat. No. 4,052,290.

Petroleum Pitch

Another component of the present invention is petroleum pitch which is generically defined as a heavy thermal tar resulting from thermal or catalytic polymerization of lighter hydrocarbon materials. Petroleum pitch is the residue from heat treatment and distillation of petroleum fractions. Petroleum pitch is a solid at room temperature, consists of a complex mixture of numerous predominantly aromatic and alkyl-substituted aromatic hydrocarbons, and exhibits a broad softening point range instead of a defined melting point.

A comparison between the physical and chemical properties of petroleum pitches and the new pitch binder product of the present invention is shown in Table I.

TABLE I

Physical & Chemical Properties of Petroleum Based Binder Pitches

| Analysis | Test Method | Petroleum Pitch A | Petroleum Pitch B | Petroleum Pitch C | New Pitch Binder |
|---|---|---|---|---|---|
| Softening Point, Mettler, ° C. | ASTM D3104 | 121.0 | 121 | 120 | 101.5 |
| Coking Value, wt % | ASTM D2416 | 50 | 41.4 | 49.2 | 387 |

TABLE I-continued

Physical & Chemical Properties of Petroleum Based Binder Pitches

| Analysis | Test Method | Petroleum Pitch A | Petroleum Pitch B | Petroleum Pitch C | New Pitch Binder |
|---|---|---|---|---|---|
| Sulfur Content, wt % | ASTM D1502 | <3 | <3 | 0.2 | 4.1 |
| Specific Gravity, g/cc | ASTM D78 | 1.23 | 1.15 | 1.24 | 1.128 |
| Ash Content, wt % | ASTM D2415 | <0.1 | <0.1 | <0.1 | <0.1 |
| Flash Point, Cleveland Open Cup, °C. | ASTM D92 | >270 | >270 | >270 | >300 |
| Viscosity, absolute, cps | ASTM D4402 | | | | |
| 125° C.    257° F. | | — | — | — | 18,870 |
| 150° C.    302° F. | | 9,201 | — | — | 1,850 |
| 175° C.    347° F. | | 736 | — | — | 365 |
| 200° C.    392° F. | | 148 | 300 | 232 | 115 |
| 225° C.    437° F. | | 49.1 | — | 90 | — |

Table II shows identified polycylic aromatic hydrocarbon compounds in the petroleum pitches and in the petroleum pitch material of the present invention. Gas chromatography/mass spectroscopy was used to quantify the amount of polycylic aromatic hydrocarbon present in the products. The pitch material of the present invention has from about 3 to about 20 times less of the amount of total identified polycyclic aromatic hydrocarbon compounds than the commercially available petroleum pitch materials.

The material of the present invention contains essentially no reportable concentrations, i.e., >0.1 wt % (per OSHA regulations (1910.1200) of detectable regulated polycyclic aromatic hydrocarbons). In certain embodiment, the total identified polycyclic aromatic hydrocarbon content is less than about 5,000 mg/kg, and in certain embodiments, as shown in Table II below, less than about 4000 mg/kg.

TABLE II

Identified Polycyclic Aromatic Hydrocarbon Compounds In Petroleum Based Binder Pitches

| Compound ID | Detection Limit, mg/kg | Petroleum Pitch A | Petroleum Pitch B | Petroleum Pitch C | New Pitch Binder |
|---|---|---|---|---|---|
| Total Identified Polycylic Aromatic Compounds | — | 18,420 | 12,720 | 80,860 | 3,910 |

Coal Tar Pitch

In certain embodiments, while coal tar pitch is not a preferred material, it is possible to use a predetermined amount of coal tar pitch, with only some degradation in environmental properties.

Thus, environmental constraints will usually preclude the use of coal tar pitch as the sole pitch component herein, but it is possible to blend in varying amounts of coal tar pitch with petroleum pitch, to produce an environmentally acceptable target. Based on existing regulations, it appears unlikely that "green" clay pigeon can be produced when the coal tar pitch component is more then 10-15% of the total pitch component, but in some instances it may be useful to add limited amounts of coal tar pitch for some products.

For other applications, where greater amounts of conventional coal tar components can be tolerated in the product, increasing amounts of coal tar may be used.

EXAMPLES

Example 1

Clay Pigeon Targets

The frangible pitch material is especially useful as a petroleum base hydrocarbon binder for producing a clay pigeon (target) for shooting. The targets can comprise at least one type of filler of limestone, gypsum, calcium carbonate, fly ash, heavy star, and/or other inert components or fillers. The targets are produced using the pitch binder material. The targets produced with the pitch product withstand the throwing force of the skeet machine while allowing the target to readily disintegrate upon being hit. The targets made with the present pitch composition can be molded in such a manner to allow the target to be projected with considerable speed. Further, the target is sufficiently brittle or frangible so that when the target is hit, the marksman can clearly tell by the explosive disintegration of the target that the hit has been registered.

In certain embodiments, the target can comprise of the following composition: pulverized limestone from about 65 to about 90% and binder from about 10 to about 35%.

The above detailed description of the present invention is given for explanatory purposes. It will be apparent to those skilled in the art that numerous changes and modifications can be made without departing from the scope of the invention. Accordingly, the whole of the foregoing description is to be construed in an illustrative and not a limitative sense, the scope of the invention being defined solely by the appended claims.

We claim:

1. A binder useful to produce an environmentally acceptable clay pigeon, which does not have reportable amounts of polycyclic aromatic hydrocarbons, comprising approximately 60 to about 75% wt., pulverized limestone or other suitable filler and the remainder comprising a thermoplastic frangible pitch material containing low concentrations of the polycyclic aromatic hydrocarbons comprising:
   (i) a petroleum pitch having a softening point of at least about 100° C. and (ii) an asphalt fraction having a softening point ranging from about 70° to about 160° C., wherein the asphalt fraction is produced by distillation or solvent extraction of asphalt containing petroleum crude oil, and optionally, up to about 50% of a solvent or cut back oil, and wherein the asphalt fractioni has a specific gravity ranging from about 0.90 to about 1.10:

whereby the resultant frangible pitch material has a softening point in the range of about 100° C. to about 130° C., a total identified polycyclic aromatic hydrocarbon content in the range of about 5000 mg/kg or less, and is an amorphous solid at room temperature.

2. A clay pigeon comprising a filler and a thermoplastic frangible pitch material containing low concentrations of polycyclic aromatic hydrocarbons comprising:

(i) a petroleum pitch having a softening point of at least about 100° C. and (ii) an asphalt fraction having a softening point ranging from about 700 to about 160° C., wherein the asphalt fraction is produced by distillation or solvent extraction of asphalt containing petroleum crude oil, and optionally, up to about 50% of a solvent or cut back oil, and wherein the asphalt fractioni has a specific gravity ranging from about 0.90 to about 1.10:

whereby the resultant frangible pitch material has a softening point in the range of about 100° C. to about 130° C., a total identified polycyclic aromatic hydrocarbon content in the range of about 5000 mg/kg or less, and is an amorphous solid at room temperature.

3. A clay pigeon according to claim 2 comprising about 60 to 75% of the filler and the remainder comprising the pitch material.

4. A clay pigeon according to claim 2 comprising about 65 to about 90% of the filler and from about 10 to about 35% of the pitch material.

5. A clay pigeon according to claim 2 wherein the filler is limestone, gypsum, calcium carbonate, fly ash or heavy star.

6. A clay pigeon according to claim 2 wherein the filler is pulverized limestone.

7. A clay pigeon according to claim 2 wherein the petroleum pitch asphalt fraction comprises about 20% to about 40% petroleum itch and about 60 to about 80% asphalt.

8. A clay pigeon according to claim 2 wherein the petroleum pitch asphalt fraction comprises about 40 to 60% petroleum pitch and about 40 to 60% asphalt.

9. A clay pigeon according to claim 2 having a saucer shape wherein the pigeon has a thin central region and denser edge portions.

10. A clay pigeon according to claim 9 capable of withstanding a throwing force.

11. A clay pigeon according to claim 9 that is sufficiently brittle or frangible to allow the pigeon to readily disintegrate upon being hit.

* * * * *